United States Patent Office 3,621,836
Patented Nov. 23, 1971

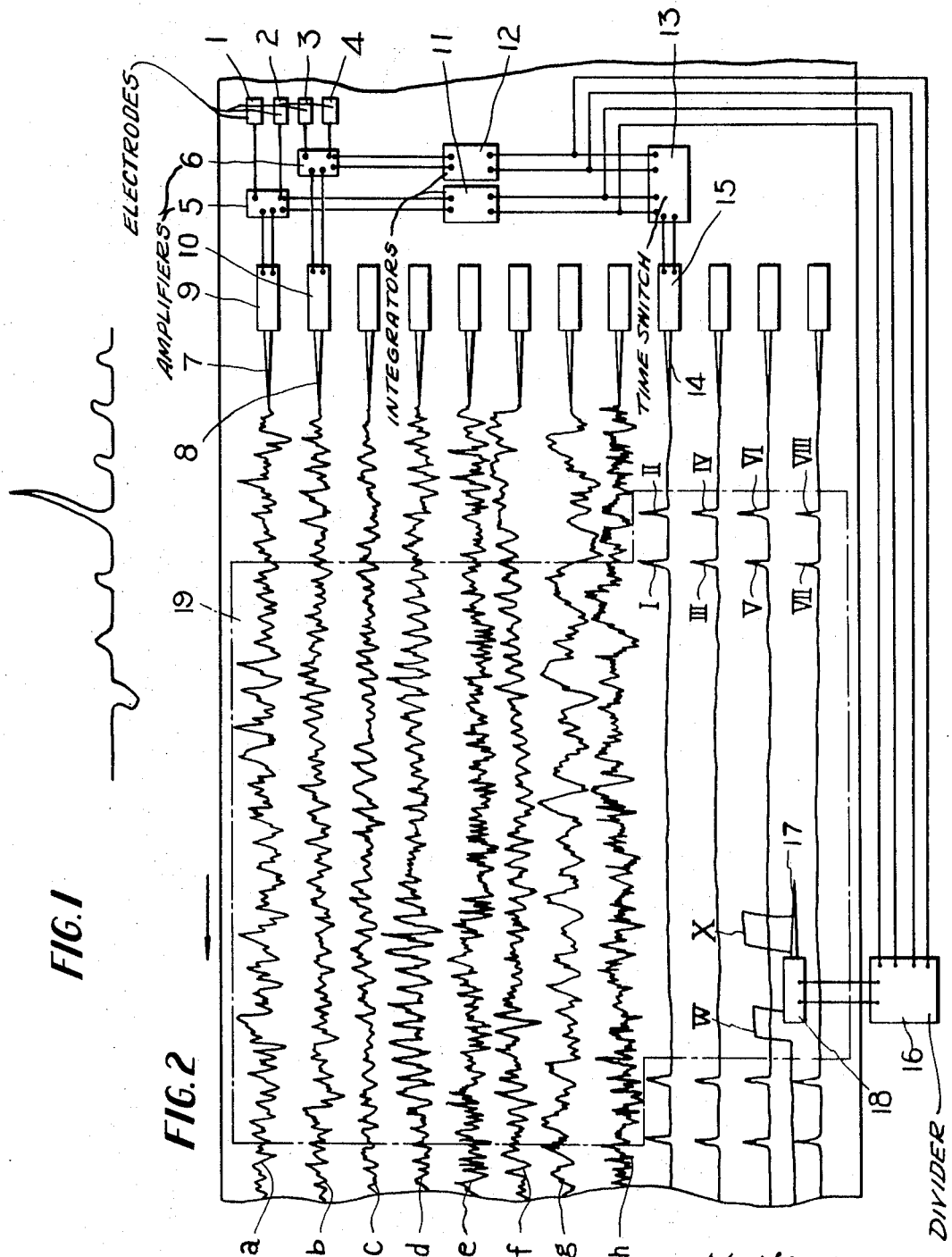

3,621,836
METHOD OF AND APPARATUS FOR MEASURING AND RECORDING THE RATE OF SLOW BRAIN WAVES
Kotaro Nagatomi, 20–19, 2-chome, Taishido, Setagaya-ku, Tokyo, Japan
Filed Apr. 6, 1970, Ser. No. 25,821
Claims priority, application Japan, Apr. 10, 1969, 44/27,250
Int. Cl. A61b 5/05
U.S. Cl. 128—2.1 B          4 Claims

ABSTRACT OF THE DISCLOSURE

A method of and an apparatus for measuring and recording the rate of slow brain waves comprising at least a pair of electrodes to be mounted on the head of a person to be examined, integrator means for integrating the slow brain waves and all the brain waves respectively as they are taken out through said electrodes, divider means for calculating the ratio of the output of one integrator means to the output of the other integrator means, and a mechanism for recording and indicating the result of calculation in conformity with the output of said divider means.

---

This invention relates to a method of and an apparatus for determining quickly, positively and accurately by anyone having no skill without needing calculation the presence or absence of organic and functional disorders of the brain such as epilepsy based on the ratio of the so-called slow brain waves of relatively low frequency to all the brain waves or the rate of slow brain waves obtained by electroencephalography, automatically processed through arithmetical operations and recorded on recording paper or indicated by indication means.

This invention has as its object the provision of a method of and an apparatus for separately taking out by electroencephalography the so-called slow brain wave component of relatively low frequency and all the components of the brain waves representing fluctuations in electrical potential in the brain by means of electrodes mounted on the head of a person and automatically integrating the values obtained at regular intervals, whereby the ratio of one integrated value to the other integrated value may be automatically processed through arithmetical operations and the results obtained can be indicated by indication means or recorded on recording paper in wave form.

According to the present invention, the electrical currents developed by brain action are taken out by electroencephalography and the slow wave component and all the brain wave components of the output currents are separately integrated and converted into pulse outputs at regular intervals. The two outputs are applied to a divider unit so that the rate of slow brain waves may be calculated and the output may be indicated by indication means or recorded on recording paper in wave form. The rate of slow brain waves can be obtained directly by measuring the vertical height of the wave form. Anyone can accurately determine whether the brain waves examined are normal or abnormal based on the rate of slow brain waves obtained by the method of this invention without needing the skill usually required of a physician in examining the brain waves.

The arithmetical and recording operations are carried out at regular intervals, say for each ten seconds. Thus, the present invention makes it possible to obtain accurate results because the results of examination of the brain waves for each person are based on an average of values obtained by carrying out tests many times.

The wave form obtained may be indicated on a cathode ray tube for observation and diagnosis simultaneously as the tests are carried out or recorded on recording paper for examination and diagnosis at a later date. In the latter case, the results obtained with a number of persons to be examined can be recorded on a sheet of recording paper of small width and a number of persons can be subjected to a test simultaneously. Thus, the method according to this invention permits to examine a large number of persons in a short interval of time with efficiency. It will be appreciated from this that the method according to this invention lends itself to use in testing, for example, the aptitude of persons for motor vehicle driving. The invention permits to readily determine by simple means the presence or absence of brain disorders such as epilepsy or the like in the persons tested.

It has hitherto been customary to collectively examine the recorded brain waves from all the angles and determine the rate of slow brain waves as being low, medium and high based on the results of examination of the brain waves as a whole. It has been inevitable that the results of examination of the brain waves of one person should vary from one physician to another because there are no objective standards for examination. The results of examination of the brain waves of one person have often differed according to each physician's subjective point of view.

The present invention obviates all the disadvantages mentioned above. The method provided by this invention and the apparatus for carrying the method into practice permit to indicate the rate of slow brain waves in numerical values, so that diagnosis can be made readily, quickly and accurately without the disadvantage of developing individual variations in response to the results of test.

The apparatus provided by this invention is low in cost and permits to accomplish the objects of the invention economically. According to this invention, a slow brain wave rate calculating device may be manufactured independently and connected to an electroencephalometer. The electrical currents developed by brain action and taken out from a person to be tested may be applied to the device after being amplified and the currents indicating the rate of slow brain waves may be taken out as an output signal which is used for indicating the rate of slow brain waves by indication means such as a cathode ray tube or recording on recording paper.

Additional objects as well as features and advantages of the invention will become evident from the description set forth hereinafter when considered in conjunction with the accompanying drawings, in which:

FIG. 1 shows a wave form produced by a conventional brain wave analyzing device; and FIG. 2 is a view in explanation of the apparatus according to this invention, with wave forms produced by the apparatus being shown.

Present practice in electroencephalographic examination of the brain for detecting the presence of organic and functional disorders requiring the mounting of ten or more electrodes on the head of a person to be examined for taking out several kinds of electrical currents developed by brain action which are recorded by pens on recording paper in wave form. The wave forms representing fluctuations in electrical potential are collectively examined from all the angles and the presence or absence of disorders is determined based on the observations made by a physician. It has hitherto been impossible for persons other than skilled physicians having experiences in clinical examinations to obtain accurate results in diagnosis based on the examination of brain waves.

Several proposals have been made to obviate this disadvantage. For example, a brain wave analyzing apparatus of the Walter type is one of the apparatus developed for this purpose. This apparatus operates such that the brain waves of one or two kinds are divided into five types of waves or those having a frequency band of 2 to 4 cycles, those having a frequency band of 4 to 8 cycles, those having a frequency band of 8 to 13 cycles, those having a frequency band of 13 to 20 cycles and those having a frequency band of 20 to 30 cycles. These waves are taken out in wave form by using narrow-band filters, and the area surrounded by the base line and the wave form of positive or negative direction is integrated for each band. The values obtained of all the bands are shown by the vertical heights of the waves as shown in FIG. 1. The physician in charge carries out complicated calculation based on the vertical heights of the waves to obtain the so-called values of energy. The value of energy for one band is compared with the value of energy for another band so as to determine the number of brain waves of each band which forms the basis for determining the presence or absence of disorders in the brain. This apparatus involves a troublesome operation because the value of integration of the wave form for each band is indicated as a wave form of different vertical height which constitutes the basis of determination of the presence or absence of brain disorders. Thus, it is impossible to obtain accurate results quickly by using this apparatus.

It has been found that the number of so-called slow waves having a frequency range of 2 to 8.5 cycles is the most important factor in determining the presence or absence of brain disorders by examining the brain waves of an adult when awake. Thus, if the rate of appearance of the slow waves in all the brain waves is measured, it will be possible to determine whether the brain waves of a particular person is normal or abnormal, because it is known that the brain waves having a low rate of slow waves are normal and the brain waves having a high rate of slow waves are abnormal.

The present invention is based on this finding. One embodiment of the invention will be explained with reference to FIG. 2, in which two pairs of electrodes 1 and 2 and 3 and 4 to be mounted on the head of a person are connected through amplifier means 5 and 6 to actuation means 9 and 10 for operating recording pens 7 and 8 respectively.

The amplifier means 5 and 6 are connected to slow wave integrator means 11 and all wave integrator means 12 which are connected through a time switch 13 to actuation means 15 for a recording pen 14. The two integrator means 11 and 12 are also connected to a divider means 16 which is connected to actuation means 18 for a recording pen 17.

In operation, if the electrodes 1, 2, 3 and 4 are mounted on the head of a person to be examined, electrical currents developed by brain action can be taken out through the electrodes 1 and 2 and 3 and 4. The electric currents are amplified by the amplifier means 5 and 6 and supplied to the actuation means 9 and 10 for operating the recording pens 7 and 8 respectively. By moving a sheet of recording paper 19 at this time, it is possible to produce two types of wave forms $a$ and $b$ on the recording paper 19.

On the other hand, the amplified electric currents are transmitted to the slow wave integrator means 11 and all wave integrator means 12 for integrating the slow wave component and all the wave components respectively into pulse outputs. The pulse currents produced in this way are supplied, through the time switch 13 which is actuated and closed at intervals of ten seconds, for example, to the actuation means 15 for operating the the recording pen 14 twice, so that a wave form I for all the waves is first produced and a wave form II for the slow wave component is then produced as pulse waves.

The outputs of the two integrator means 11 and 12 are also supplied to the divider means 16 so as to produce the rate of slow wave by dividing the slow brain wave component by all the brain wave components. The output signal of the divider means 16 is supplied to the actuation means 18 for operating the recording pen 17 which produces a wave form W having a vertical height which is proportional to the magnitude of the input signal of the operation means 18.

It will be evident that by measuring the vertical height of the wave form W, it is possible to obtain the rate of slow brain waves. The larger the vertical height of the wave form W, the higher the rate of slow brain waves; the smaller the vertical height thereof, the lower the rate of slow brain waves.

Wave forms obtained by simultaneously examining four persons A, B, C and D are shown on the recording paper 19 in FIG. 2. The wave forms for A are represented by the waves $a$, $b$, I, II and W; the wave forms for B are represented by waves $c$, $d$, III, IV and X; the wave forms for C are represented by waves $e$, $f$, V, VI and Y (not shown); and the wave forms for D are represented by waves $g$, $h$, VII, VIII and Z (not shown). The portion surrounded by dash-and-dot lines indicates the results obtained in one operation performed at intervals of ten seconds. It will be seen that the brain wave recording pens 7 and 8 and integrated slow wave value and integrated all wave value recording pen 14 are arranged in a line which is normal to the direction of movement of the recording paper 19 while the rate of slow wave recording pen 17 is arranged in a position spaced from the recording pen 14 in the direction of movement of the recording paper 19. This arrangement permits to record the wave form for the rate of slow waves in a position adjacent the position in which other wave forms are recorded, in spite of the fact that the results of operation for producing the former are obtained later than the results of operation for producing the latter.

The brain wave forms $a$, $b$, $c$ . . . and the integrated slow wave value and integrated all wave value in wave form I, II, III . . . can be produced simultaneously for the four persons under examination because detection means and recording pens are provided for each person. However, since there is provided only one pen for recording the rate of slow wave for all four persons, the integrated value signals for the presons B, C and D under examination are stored temporarily in a memory and successively taken out later by means of a time switch for application to the actuation means 18 for the recording pen 17. Thus, the wave forms W, X, Y and Z can be produced continuously.

In the embodiment shown and described, the brain wave forms $a$, $b$, $c$ . . . and integrated value in wave form I, II, III . . . are produced on the recording paper in addition to the wave forms for the rate of slow waves W, X, Y and Z so as to enable the invention to be clearly understood. It should be noted, however, that what are important for accomplishing the purposes of the invention are only the wave forms W, X, Y and Z, other wave forms not being essential to attain the ends of the invention. Thus, the apparatus according to this invention requires only one recording pen and the recording paper used may have a small width.

What is claimed is:

1. A method of measuring and recording the rate of slow brain waves comprising the steps of taking out through electrodes mounted on the head of a person electric currents developed by brain action, automatically integrating the so-called slow brain wave component of relatively low frequencies and all the brain wave components separately at regular intervals, and automatically calculating the ratio of the integrated value of the slow brain waves component to the integrated value of all the brain wave components, and recording or indicating the results obtained.

2. A method as defined in claim 1 wherein the step of recording comprises the step of producing the ratio of the integrated value of the slow brain wave component to the integrated value of all the brain wave components in wave form on recording paper.

3. An apparatus for measuring and recording the rate of slow brain waves comprising at least a pair of electrodes to be mounted on the head of a person to be examined, integrator means for integrating the slow brain waves and all the brain waves respectively as they are taken out through said electrodes, divider means for calculating the ratio of the output of one integrator means to the output of the other integrator means, and a means for recording and indicating the result of calculation in conformity with the output of said divider means.

4. An apparatus as defined in claim 3 further comprising a means for recording and indicating the output signals of said electrodes and the integrated values of the slow brain waves and all the brain waves.

References Cited

UNITED STATES PATENTS

| | | | |
|---|---|---|---|
| 2,933,364 | 4/1960 | Campbell | 128—2.1 B |
| 3,087,488 | 4/1963 | Streimer | 128—2.05 Q |
| 3,123,768 | 3/1964 | Burch et al. | 128—2.1 B |
| 3,413,546 | 1/1968 | Riehl et al. | 128—2.1 B |

OTHER REFERENCES

Davis: "IRE Transactions on Medical Electronics," vol. PGME–11, July 1958, pp. 29–34.

WILLIAM E. KAMM, Primary Examiner